United States Patent [19]

Cheng et al.

[11] Patent Number: 5,547,564
[45] Date of Patent: Aug. 20, 1996

[54] CATALYTIC CRACKING

[75] Inventors: Wu-Cheng Cheng, Elliot City; Kuppuswamy Rajagopalan, Columbia, both of Md.

[73] Assignee: W. R. Grace & Co.-Conn., New York, N.Y.

[21] Appl. No.: 446,394

[22] Filed: May 22, 1995

Related U.S. Application Data

[63] Continuation of Ser. No. 994,054, Dec. 15, 1992, abandoned, which is a continuation of Ser. No. 719,453, Jun. 24, 1991, abandoned, which is a division of Ser. No. 533,227, Jun. 4, 1990, Pat. No. 5,168,086, which is a continuation-in-part of Ser. No. 318,099, Mar. 2, 1989, abandoned.

[51] Int. Cl.$^6$ ............................................. C10G 11/04
[52] U.S. Cl. ........................... 208/122; 208/113; 208/120
[58] Field of Search ................................. 208/113, 120, 208/120 MC, 122; 502/500

[56] References Cited

U.S. PATENT DOCUMENTS

| | | | |
|---|---|---|---|
| 3,609,103 | 9/1971 | Gladrow et al. | 502/68 |
| 4,010,116 | 3/1977 | Secor et al. | 502/500 |
| 4,086,187 | 4/1978 | Lim et al. | 502/68 |
| 4,107,088 | 8/1978 | Elliott, Jr. | 502/68 |
| 4,325,811 | 4/1982 | Sorrentino | 208/113 |
| 4,780,195 | 10/1988 | Miller | 208/120 |

FOREIGN PATENT DOCUMENTS 63-270545  11/1988  Japan.
63-270546  11/1988  Japan.

OTHER PUBLICATIONS

"Studies on the Metal Poisoning and Metal Resistance of Zeolitic Cracking Catalysts" Arthur W. Chester, Ind. Eng. Chem. Res. 1987, 26, pp. 863–869.

"Metal Contamination of Cracking Catalysts. 1. Synthetic Metal Deposition on Fresh Catalysts", Bruce R. Mitchell, Ind. Dev. 1980, 19, pp. 209–213 (no Month).

*Primary Examiner*—Asok Pal
*Assistant Examiner*—Walter D. Griffin
*Attorney, Agent, or Firm*—Steven Capella

[57] ABSTRACT

Catalytic cracking catalysts which contain bayerite and/or eta alumina are used to process hydrocarbon feedstocks that contain nickel.

10 Claims, 3 Drawing Sheets

ACTIVITY PLOT

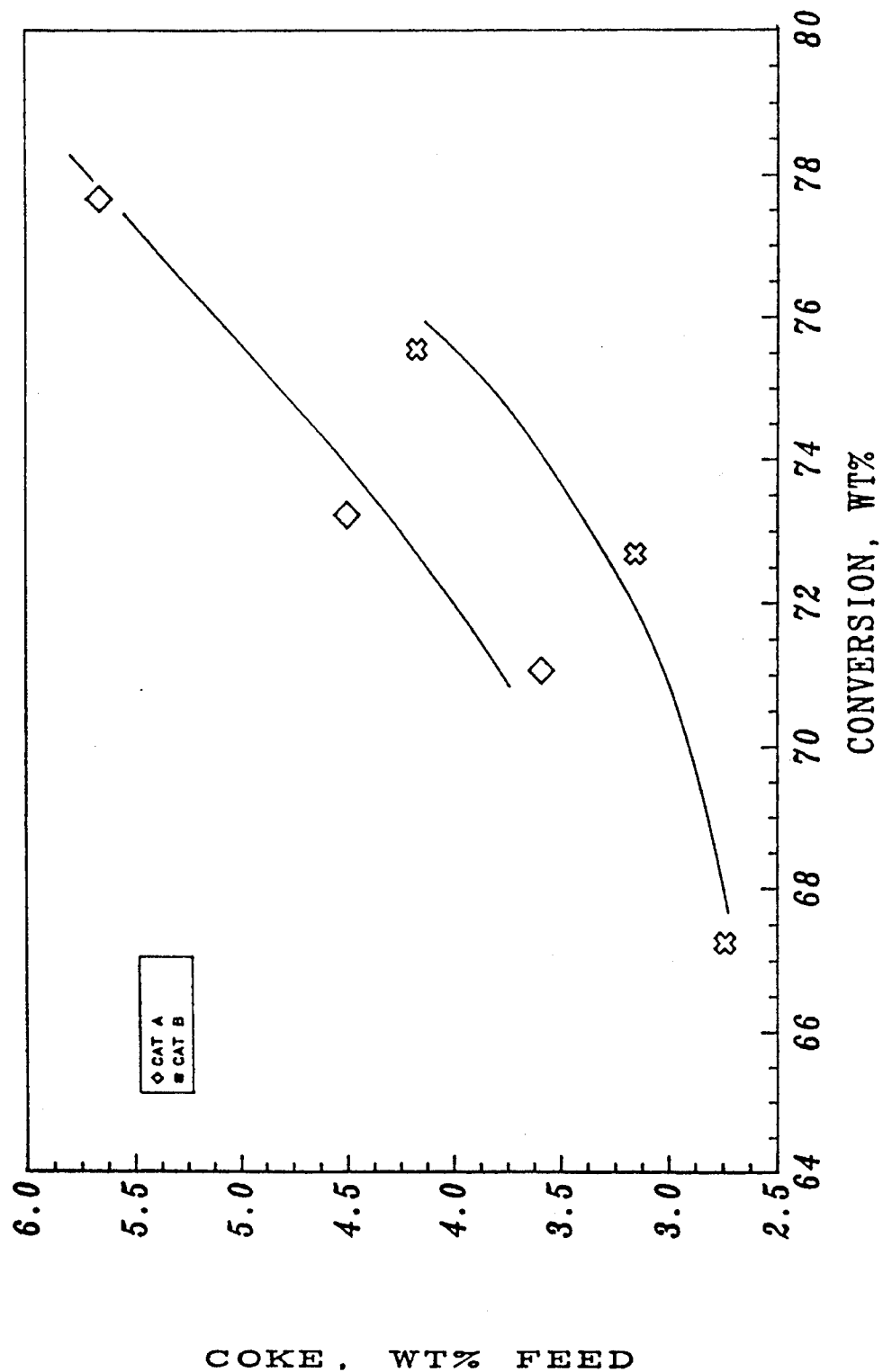

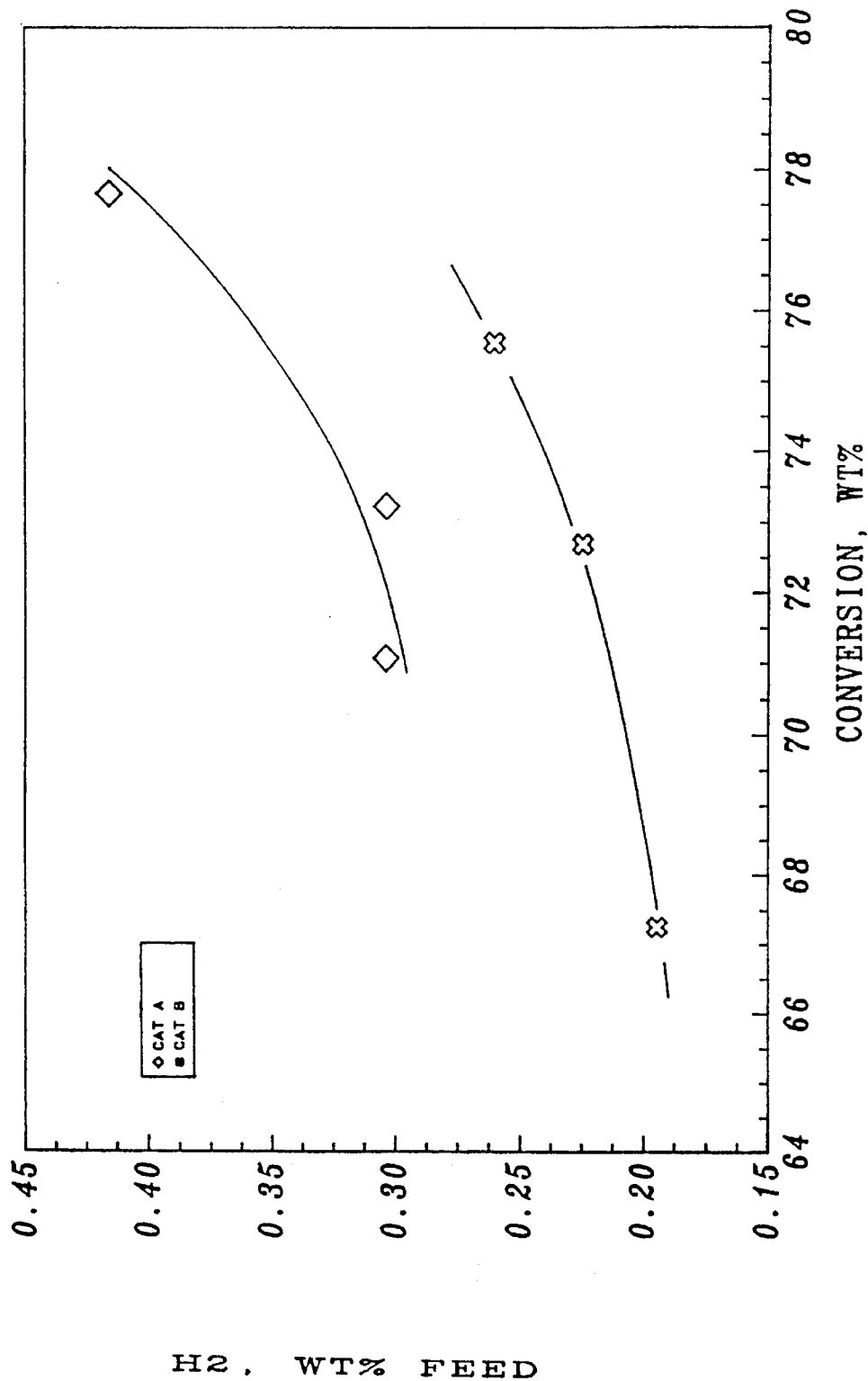

CATALYTIC CRACKING

This is a continuation of application Ser. No. 07/994,054, filed Dec. 15, 1992 now abandoned, which is a continuation of application Ser. No. 719,453, filed Jun. 24, 1991, now abandoned, which is a division of application Ser. No. 533,227, filed Jun. 4, 1990, now U.S. Pat. No. 5,168,086, which is a continuation-in-part of application Ser. No. 318,099, filed Mar. 2, 1989, now abandoned.

The present invention relates to catalytic cracking, and more specifically to catalytic cracking compositions and processes that may be used to catalytically convert high molecular weight nickel containing feedstocks into valuable lower molecular weight products.

It is generally known that catalytic cracking catalysts which comprise zeolites such as synthetic faujasite and ZSM-5 dispersed in an inorganic oxide matrix such as silica/alumina hydrogel, sols and clay may be used to economically convert heavy hydrocarbon feedstocks such as gas-oils and/or resid into gasoline and diesel fuel.

More recently it has been disclosed that the addition of aluminas to cracking catalyst compositions will improve the overall performance of the catalyst particularly when used to process feedstocks that contain significant quantities of sulfur and/or contaminant metals such as vanadium and nickel.

Canadian patent 1,117,511 describes FCC catalysts which contain free alumina hydrate, particularly alpha-alumina hydrate (boehmite) which may be used to catalytically crack hydrocarbons that contain sulfur and/or metals including nickel and vanadium.

Japanese Patent Publication 84/1088 discloses catalytic cracking catalysts which contain aluminas such as Bayer Process aluminas (gibbsite), rho, and bayerite that are particularly effective for reducing the production of coke and hydrogen when used to process hydrodesulfurised Kuwait vacuum gas-oil.

U.S. Pat No. 4,010,116 discloses FCC catalysts which contain pseudo-boehmite aluminas that may contain crystalline trihydrate components such as bayerite and gibbsite.

U.S. Pat No. 3,312,615 discloses the use of inorganic oxides such as eta alumina in the preparation of FCC catalysts.

While it is recognized that aluminas including bayerite, eta, pseudoboehmite and gibbsite may be added to catalytic cracking catalysts to improve the stability and coke/dry gas selectivity thereof, the industry has not fully developed catalytic cracking catalyst compositions and processes wherein nickel containing feedstocks may be economically processed.

SUMMARY OF THE INVENTION

It is therefore an object of the present invention to provide an improved catalytic cracking composition and process for converting nickel containing hydrocarbon feedstocks to more valuable low molecular weight products such as gasoline and diesel fuel.

It is a further object to provide a catalytic cracking process wherein hydrocarbon feedstocks containing in excess of about 10 ppm nickel may be economically processed in conventional FCC units.

It is a further object to provide an improved alumina containing FCC catalyst composition which can tolerate large quantities of nickel without producing unacceptable quantities of coke and hydrogen.

It is still a further object to provide commercially useful FCC catalysts which possess both a high density and high degree of attrition resistance that may be used to process hydrocarbon feedstocks which contain high levels of metals, particularly nickel.

BRIEF DESCRIPTION OF THE DRAWINGS

FIGS. 1, 2, and 3 are graphic plots of data obtained during the evaluation of catalysts of the prior art and catalysts of the present invention.

DESCRIPTION OF THE INVENTION

Figure 1:
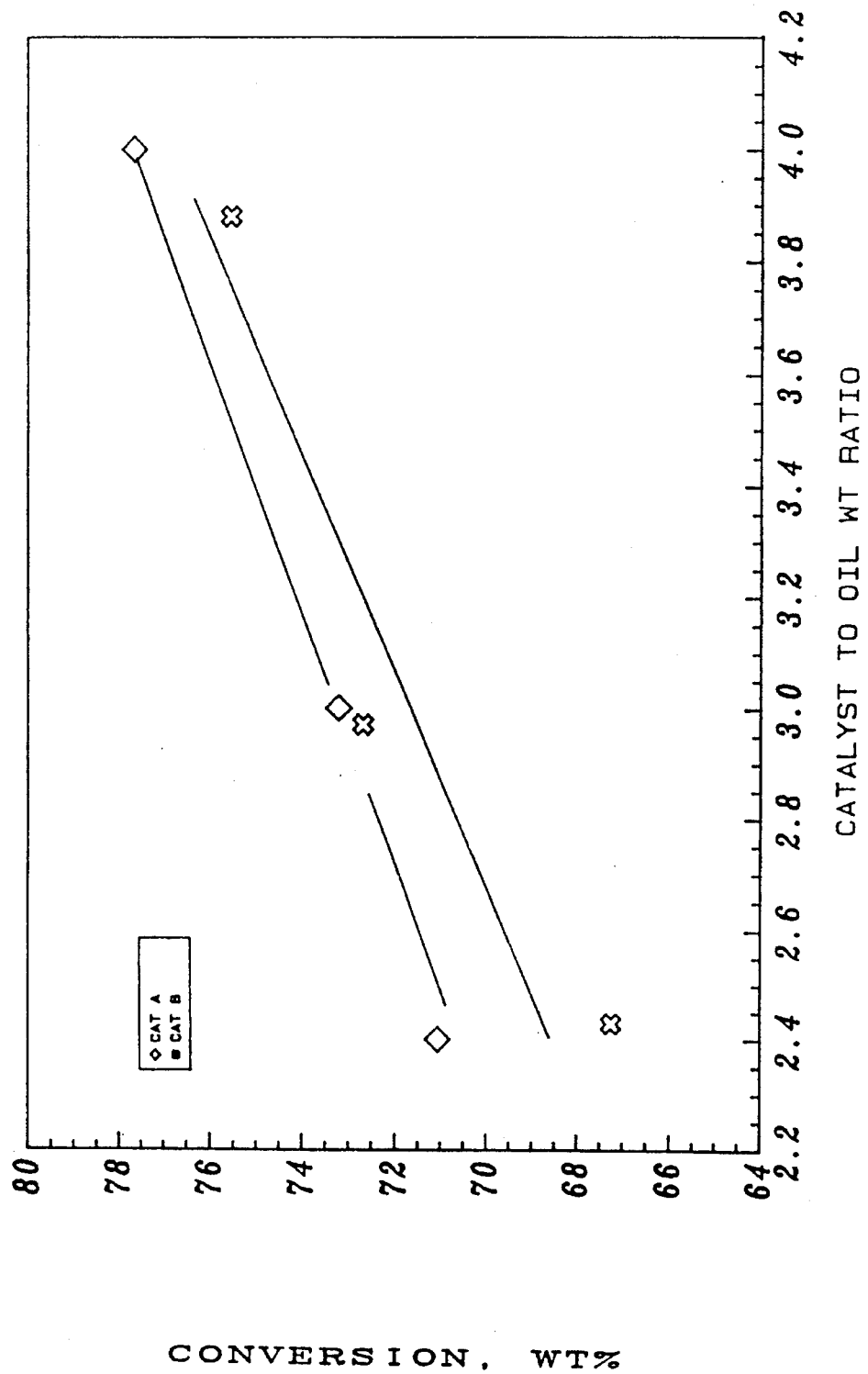

Broadly, our invention contemplates catalytic cracking catalyst compositions that contain bayerite and/or eta alumina and the use thereof to process nickel containing hydrocarbon feedstocks.

More specifically, we have discovered that catalyst compositions containing certain type of aluminas (bayerite and/or eta alumina) are more effective for the cracking of Ni containing feedstock than compositions containing other types of aluminas (e.g. pseudoboehmite, gibbsite). We have found that if from about 2 to 40 wt. % bayerite and/or eta alumina is added to zeolite containing catalytic cracking catalysts, the catalysts may be used in the catalytic cracking of nickel containing feedstocks until the amount of nickel deposited on the catalysts reaches about 5000 ppm and in some instances as high as 8000 ppm.

Catalysts which may be used in the practice of our invention typically contain crystalline aluminosilicate zeolites such as synthetic faujasite i.e. type Y zeolite, type X zeolite, Zeolite Beta, ZSM-5, as well as heat treated (calcined) and/or rare-earth exchange derivatives thereof. Zeolites which are particularly suited include calcined rare-earth exchanged type Y zeolite (CREY), the preparation of which is disclosed in U.S. Pat No. 3,402,996, ultrastable type Y zeolite (USY) as disclosed in U.S. Pat No. 3,293,192 as well as various partially exchanged type Y zeolites as disclosed in U.S. Pat No.3,607,043 and 3,676,368. The catalysts may also contain molecular sieves such as SAPO and ALPO as disclosed in U.S. Pat No. 4,764,269.

The catalyst compositions will include from about 5 to 50 wt. % molecular sieve, about 2 to 40 wt. % bayerite and/or eta alumina, and the balance will comprise inorganic oxide binders and additives such as silica, silica alumina and alumina gels and sols as well as clay such as kaolin.

The cracking catalyst compositions of the invention preferably contain about 2 to 40 wt. % total of bayerite and/or eta alumina, about 5 to 50 wt. % synthetic faujasite, about 10 to 60 wt. % clay, and 10 to 30 wt. % inorganic oxide binder selected from the group consisting of hydrogels of silica, alumina, or silica-alumina and sols of silica, alumina, or silica-alumina.

The preparation of the catalysts involves combining molecular sieve, bayerite and/or eta alumina and the desired matrix components, such as clay and/or inorganic oxide binders, into an aqueous slurry, and forming the slurry into catalyst particles of desired size. To obtain fluid catalytic cracking catalysts (FCC) the slurry is spray dried to obtain particles having a size range from about 20 to 140 microns. Procedures that may be used in the practice of the invention are disclosed in U.S. Pat. Nos. 3,957,689, 4,126,579, 4,226,743, 4,458,023 and Canadian patent 967,136.

Using the catalyst preparation procedures set forth in U.S. Pat Nos. 3,957,689 and 4,458,023, catalysts of the present invention are obtained which are attrition resistant and particularly suited for use in commercial FCC operations. Catalysts of the present invention which include the silica/alumina sol binder matrix described in U.S. Pat No. 3,957,689 or the alumina sol binder described in U.S. Pat No. 4,458,023 will possess a Davison Attrition Index of 12 or less. The Davison Attrition Index, DI, is determined by the following procedure.

DI Test

A 7 g sample of catalyst is screened to remove particles in the 0 to 20 micron size range. The particles above 20 microns are then subjected to a 5 hour test in the standard Roller Particle Size Analyzer using a 0.07 inch jet and 1 inch I.D. U-Tube as supplied by American Instrument Company, Silver Spring, Md. An air flew of 21 liters per minute is used. The Davison Index is calculated as follows:

$$\frac{\text{Davison}}{\text{Index}} = \frac{\text{Wt. 0–20 micron material formed during test}}{\text{Wt. original 20 + micron fraction}} \times 100$$

Accordingly, the catalysts of the present invention are characterized by a DI of about 12 or less and preferably below about 10, and more preferably from about 1 to 10 and an average bulk density (ABD) of about 0.6 to 1 g/cm$^3$ and preferably 0.7 to 1 g/cm$^3$ subsequent to heating in air for 2 hours at 1000° F.

The hydrocarbon feedstocks that are used typically contain in excess of 2 ppm Ni, more typically from about 2 to 10 ppm and as much as 15 ppm nickel. These feedstocks include gas-oils which have a boiling range of from about 340° to 565° C. as well as residual feedstocks and mixtures thereof.

The catalytic cracking process is conducted in conventional FCC units wherein reaction temperatures that range of from about 400° to 700° C. and regeneration temperatures from about 500° to 850° C. are utilized. The catalyst, i.e. inventory, is circulated through the unit in a continuous reaction/regeneration process during which nickel is deposited on the catalyst. The catalyst inventory is maintained at a nickel level preferably in excess of about 300ppm Ni, more preferably from 300 to 2500 ppm and in some instances as high as 3000 to 8000 ppm by the addition of fresh catalyst and removal of equilibrium catalyst. During use, some of the bayerite may be converted to eta alumina at reaction temperatures employed during the catalytic cracking process. As indicated in the literature bayerite can be converted to eta alumina by heating to temperatures in excess of about 250° C. It is observed that at the equilibrium nickel levels described above the quantity of coke and hydrogen (C+H$_2$) (as measured in a pilot plant) will remain within acceptable levels i.e. from about 3 to 6 wt. % C and from about 0.3 to 0.8 wt. % H$_2$ based on the weight of fresh feed processed.

The bayerite used to prepare the catalysts can be obtained by processes described in U.S. Pat. No. 3,092,454. If it is desired to convert the bayerite to eta alumina prior to incorporation in the catalyst, the Bayerite is heated to a temperature of from about 250° to 400° C for a period of 0.5 to 2 hours. Commercially available bayerite aluminas such as Versal B from La Roche Chemical Inc., Baton Rouge, La, having a bayerite phase purity of 95 wt. %, and Alcoa C-37 having a bayerite phase purity of greater than 80%, are particularly suited for use in the present invention.

Having described the basic aspects of the invention the following examples are given to illustrate specific embodiments.

EXAMPLE 1

CATALYST A (COMPARISON)

A mixture containing 5195 g of (NAY), 2806 g of VFA (a pseudo-boehmite available from the Davison Chemical Division of W. R. Grace and Co.-Conn.) and 7920 g of H$_2$O was milled to micron size in a colloid mill, diluted with kaolin clay and 8000 g silica sol (prepared from sodium silicate and H$_2$SO$_4$) and spray dried. The catalyst, which had a formulation of 20% NaY, 20% Al$_2$O$_3$ 20% SiO$_2$ and 40% clay, was successively ion-exchanged with a 3 wt. % solution of ammonium sulfate and a rare earth chloride solution. The catalyst was calcined for 2 hours at 1000° F. During calcination, the pseudo-bohemite was converted to gamma-alumina.

EXAMPLE 2

CATALYST B (INVENTION)

A catalyst identical in formulation to Catalyst A was prepared. The only exception was that a bayerite (Versal B from La Roche Chemical) was used in place of the pseudo-boehmite. During calcination, some of the bayerite transformed to eta-alumina.

EXAMPLE 3

(EVALUATION).

Catalysts A and B were impregnated with nickel naphthenate to about 3000 ppm Ni and deactivated for 6 hours at 1350° F in flowing steam at 2 atmosphere pressure. Properties of Catalysts A and B are shown in Table I. The nickel-impregnated and steamed catalysts were used to crack a West Texas heavy gas oil at 930° F. and a contact time of 75 seconds. The results are shown graphically in FIGS. 1, 2, and 3. At a constant conversion, Catalyst B of the invention (with eta-alumina) produced significantly lower levels of coke and hydrogen than comparison Catalyst A (with gamma-alumina). In particular: FIG. 1 shows that Catalyst A is more active than Catalyst B by 1 to 2 microactivity numbers; FIG. 2 shows that the catalyst of the present invention, Catalyst B, made about 20% less coke than Catalyst A; and FIG. 3 shows that Catalyst B made about 30% less hydrogen than Catalyst A.

TABLE I

| | PROPERTIES | |
|---|---|---|
| Catalyst Alumina Type | Catalyst A pseudo-boehmite | Catalyst B bayerite |
| Chemical Properties (Wt. %) | | |
| Cl | <.01 | <.01 |
| RE$_2$O$_3$ | 2.81 | 2.71 |
| Na$_2$O | 0.79 | 0.84 |
| Al$_2$O$_3$ | 41.2 | 41.0 |
| SO$_4$ | 1.68 | 0.5 |
| Physical Properties (Fresh) | | |
| Davison Attrition Index | 4 | 2 |
| Bulk Density/g cm$^{-3}$ | 0.75 | 0.78 |
| Average Particle Size | 63 | 74 |
| BET Surface Area/m$^2$g$^{-1}$ | 214 | 219 |
| Nickel Content and Physical Properties after Steaming | | |
| ppm Ni | 3074 | 3157 |
| pk. ht. (mm) | 33 | 28 |
| Zeolite Unit Cell/Å | 24.48 | 24.40 |
| Zeolite SA/m$^2$g$^{-1}$ | 59 | 63 |
| Matrix SA/m$^2$g$^{-1}$ | 57 | 50 |

EXAMPLE 4

CATALYST C (INVENTION)

3.1 of ultrastable Y-zeolite (24.58 Å unit cell size, $Na_2O$ 3.99 wt. %) and 1.24 kg of bayerite having 85% bayerite phase purity as determined by X-ray diffraction (XRD) was slurried in 1.1 kg of water. The slurry combination was acidified to pH=4 with 20% $H_2SO_4$ and milled to an average particle size of 3 to 5 microns.

A sodium silicate solution having 12.5 wt. % $SiO_2$ and a $Na_2O/SiO_2$ mol ratio of 0.33 was prepared. This solution had a specific gravity of 1.142 g per $cm^3$. An acid alum solution was prepared by mixing 29.2 kg of 20% $H_2SO_4$ with 16.6 kg of an aluminum sulfate solution (specific gravity 1.306 g per $cm^3$) and diluted with 3.84 kg of $H_2$. The sodium silicate solution and the acid alum solution were fed together into a mix pump to form a sol. The flow rate of the sodium silicate solution was 700 ml/min. The flow rate of the acid alum solution was adjusted to maintain the pH of the outlet at between 3.0 and 3.1. The average flowrate of the acid alum solution was 290 ml/min.

To 8 kg of the above formed silica sol was added 1.65 kg of kaolin clay and 6.2 kg of the zeolite/bayerite slurry. This mixture was spray dried to form particles in the 20 to 140 micron range. The spray dryer feed mixture has a gel time of typically less than 2 hours. Beyond this time the material gels and becomes impossible to feed to the spray dryer without further dilution. To ensure good attrition properties, it is critical that the mixture be spray dried quickly, before the onset of gelation.

The spray dried catalyst was washed to lower $Na_2O$ and exchanged with a rare earth chloride solution to get 3.4 wt. % $RE_2O_3$ on catalyst. The above catalyst had an average bulk density of 0.72 g/$cm^3$ and a Davison attrition index (DI) of 8. Other properties of this catalyst are shown in Table II.

EXAMPLE 5

CATALYST D (INVENTION)

6.9 kg of Rare Earth exchanged, ultrastable Y zeolite (Unit Cell Size=24.57 Å) filter cake having a total volatile content of 58%, and containing 3.5 wt. % rare earth oxide and 0.95 wt. % $Na_2O$ was blended with 620 g of a bayerite with 85% phase purity and slurried in 3.5 kg of water. This slurry was acidified to pH 4 with 4M HCl and milled to an average particle size of 3 to 5 microns.

The zeolite/bayerite slurry was mixed with 2.6 kg of an aluminum chlorhydrol sol, having 23% $Al_2O_3$ and a Cl/Al mol ratio of 0.5, and 2.1 kg of kaolin clay. This mixture was spray dried and calcined for 2 hours at 500° F. and 2 hours at 1000° F. The finished catalyst (Catalyst D) had a DI of 6, an ABD of 0.8 g/$cm^3$, and the characteristics summarized in Table II.

The following examples illustrate the effect of bayerite phase purity on the catalytic performance.

EXAMPLE 6

CATALYST E (INVENTION)

The procedure used in Example 1 was followed with the exception that the bayerite used had a bayerite phase purity of 88% as determined by XRD. Catalyst E has a DI OF 12, and ABD of 0.68 g/$cm^3$, and the properties summarized in Table II.

EXAMPLE 7

CATALYST F (INVENTION)

The procedure used in Example 1 was followed with the exception that the bayerite used had a bayerite phase purity of 72% as determined by XRD. Catalyst F has a DI of 12, an ABD of 0.67 g/$cm^3$, and the properties summarized in Table II.

TABLE II

| Alumina Type | Properties of Catalysts | | | |
| --- | --- | --- | --- | --- |
|  | Catalyst C | Catalyst D | Catalyst E | Catalyst F |
| Chemical Analysis | | | | |
| Wt. % $Na_2O$ | 0.31 | 0.43 | 0.29 | 0.33 |
| Wt. % $Al_2O_3$ | 34.5 | 47.5 | 32.9 | 32.2 |
| Wt. % $RE_2O_3$ | 3.4 | 1.15 | 2.74 | 2.80 |
| Physical Properties (heated 2 hrs. @ 1000° F.) | | | | |
| Davison Attrition Index (DI) | 8 | 6 | 12 | 12 |
| Bulk Density (g/$cm^3$) | 0.72 | 0.80 | 0.68 | 0.67 |
| Average Particle Size (microns) | — | — | 68 | 57 |
| Surface Area (BET/$m^2g^{-1}$) | — | 249 | 276 | 284 |
| 1200 ppm Ni, 1800 ppm V heated 24 hours at 2350° F. 100% Steam | | | | |
| Peak Height | — | — | 72 | 74 |
| Unit Cell (Å) | — | — | 24.32 | 24.32 |
| Zeolite Area ($m^2$/g) | — | — | 144 | 142 |
| Matrix Area ($m^2$/g) | — | — | 40 | 41 |
| ppm Ni | — | — | 1326 | 1320 |
| ppm V | — | — | 1788 | 1871 |

EXAMPLE 8

EVALUATION

Catalysts E and F, with properties shown in Table II, were calcined in air at 1200° F., impregnated with 1200 ppm Ni and 1800 ppm V using a pentane solution of Ni and V naphenates, calcined in air at 1450° F. to remove the organics and steamed for 24 hours at 1350° F. at atmospheric pressure and 100% steam.

The metals-treated and steamed catalysts E and F were evaluated for their selectivity in cracking a sour imported heavy gas oil. The results are shown in Table III. Catalyst E, with a higher bayerite phase purity, was more active, made lower hydrogen and dry gas ($C_1$ and $C_2$') and higher gasoline. This example demonstrates a particularly preferred embodiment wherein a high phase-pure bayerite (i.e. greater than about 80%) is used to prepare the catalysts of the present invention.

TABLE III

Comparison of Yields between Catalyst E and Catalyst F

|  | Catalyst E | Catalyst F |
| --- | --- | --- |
| Conversion (wt. %) | 71 | 71 |
| Catalyst to Oil (weight ratio) | 3.1 | 4.5 |
| Yields (wt. %) |  |  |
| $H_2$ | .76 | .93 |
| $C_1 + C_2$'s | 2.9 | 3.3 |
| $C_3 + C_4$'s | 15.3 | 15.2 |
| $C_5^+$ Gasoline | 44.0 | 43.5 |
| LCO | 18.5 | 18.5 |
| HCO | 10.5 | 10.5 |
| Coke | 8.0 | 8.0 |
| Total | 99.96 | 99.93 |

The above examples illustrate that valuable nickel tolerant FCC catalysts may be Prepared and used in accordance with the teachings of the present invention.

What is claimed is:

1. A method for catalytically cracking hydrocarbons which comprises reacting a hydrocarbon that contains metal under catalytic cracking conditions with a catalyst composition comprising a molecular sieve dispersed in an inorganic oxide matrix which includes from about 2 to 40 weight percent total of bayerite and/or eta alumina, said catalyst being further characterized by a Davison Attrition Index (DI) of 12 or less and an average bulk density (ABD) greater than 0.6 g/cm$^3$.

2. The method of claim 1 wherein the catalyst composition has a DI of 1 to 10.

3. The method of claim 1 wherein the catalyst contains about 2 to 40 weight percent total of bayerite and/or eta alumina, about 5 to 50 weight percent synthetic faujasite, about 10 to 60 weight percent clay, and about 10 to 30 weight percent of an inorganic oxide binder selected from the group consisting of hydrogels of silica, alumina or silica-alumina and sols of silica, alumina or silica-alumina.

4. The method of claim 1 wherein the phase purity of said bayerite and/or eta alumina is about 80 percent.

5. The method of claim 3 wherein said binder is alumina sol.

6. The method of claim 1 wherein the catalyst contains at least 300 ppm Ni.

7. The method of claim 1 wherein the catalyst contains faujasite.

8. The method of claim 1 wherein the catalyst contains 300 to 2500 ppm Ni.

9. The method of claim 1 wherein the catalyst contains 300 to 8000 ppm Ni.

10. The method of claim 1 wherein the hydrocarbon contains at least about 2 ppm Ni, and the reaction is continued while maintaining a catalyst which includes from about 300 to 8000 ppm Ni that is deposited on said catalyst during the catalytic reaction.

* * * * *